United States Patent [19]
Franks et al.

[11] 4,085,608
[45] Apr. 25, 1978

[54] RETURN ELBOW AND CROSSOVER BENDER

[75] Inventors: Lawrence A. Franks; Eugene E. Eldridge, both of Sturgis, Mich.

[73] Assignee: Burr Oak Tool & Gauge Company, Sturgis, Mich.

[21] Appl. No.: 792,518

[22] Filed: May 2, 1977

[51] Int. Cl.² .......................... B21D 7/02; B21D 9/05
[52] U.S. Cl. ........................................ 72/297; 72/150
[58] Field of Search .................. 72/150, 152, 154, 155, 72/157, 159, 217, 218, 296, 297

[56] References Cited
U.S. PATENT DOCUMENTS

| | | | |
|---|---|---|---|
| 2,583,404 | 8/1948 | Wyrfel | 72/427 |
| 2,792,048 | 5/1957 | Fuchs | 72/150 |
| 2,974,706 | 3/1961 | DeWitt | 72/150 |
| 3,066,718 | 12/1962 | Chausson | 72/294 |
| 3,145,756 | 8/1964 | Hill | 72/DIG. 22 |
| 3,299,681 | 1/1967 | Hautau | 72/7 |
| 3,344,639 | 10/1967 | Sassak | 72/150 |
| 3,438,237 | 4/1969 | Sisler | 72/217 |
| 3,728,885 | 4/1973 | Ames | 72/294 |

*Primary Examiner*—E. M. Combs
*Attorney, Agent, or Firm*—Blanchard, Flynn, Thiel, Boutell & Tanis

[57] ABSTRACT

An elbow forming apparatus having a forming arbor with an exterior groove for accommodating a tube. A movable mandrel assembly, including a wiping member, is disposed opposite the arbor and has a further groove which cooperates with the arbor to confine the tube therebetween. An elongated rodlike mandrel is slidably inserted into the free end of the tube, after the latter has been fed into a position adjacent the arbor. The mandrel assembly is mounted on a first support structure which is rotatably supported on a second support structure, the latter being slidably supported on a third support structure which is rotatably supported on a frame for rotative movement. A cam-and-follower connects the mandrel assembly to the arbor so that, upon swinging movement of the third support structure, the mandrel assembly and the associated wiper is swingably moved around the arbor which causes a simultaneous and substantially linear retraction of the mandrel from the tube accompanied by a simultaneous bending of the tube about the arbor. The groove formed in the arbor preferably includes an intermediate straight portion joined between two bend portions, and the cam-and-follower maintains the mandrel assembly and the wiper closely adjacent the arbor during the swinging of the third support structure.

11 Claims, 9 Drawing Figures

RETURN ELBOW AND CROSSOVER BENDER

FIELD OF THE INVENTION

This invention relates to an improved apparatus for forming a return elbow, particularly an elbow having two bent portions joined by an intermediate straight portion, which elbow can be efficiently and accurately formed from tubular stock by a single bending operation.

BACKGROUND OF THE INVENTION

Tube-type heat exchangers are extensively utilized, and these structures normally use a plurality of tubes connected in series and disposed in adjacent parallel relationship. The adjacent tubes are connected by end fittings which are generally of a C-shaped configuration and are commonly referred to as a return or cross-over elbow. The known elbows have been difficult and costly to fabricate, or in the alternative have been unnecessarily large and space consuming. To minimize space, particularly in the lengthwise direction of the heat exchanger, the elbow is normally of a flat channel-like shape and has two substantially parallel legs joined to two 90° bends, which bends in turn are joined by an intermediate straight portion which extends transversely of the legs. Because the two bends are joined by the intermediate straight portion, these elbows have necessarily required that two sequential bending operations be performed thereon, either manually or sequentially on a bending machine. This necessarily increases the complexity of the forming operation, and also introduces dimensional variations in the finished elbow.

While attempts have been made to form the return elbow by a single bending operation, this has necessarily resulted in the finished elbow having a substantially semicircular configuration since the elbow is bent on a constant radius. This is highly undesirable since it results in the length of the elbow being substantially increased, particularly when the adjacent finned heat exchanger tubes are spaced a substantial distance apart. This elbow thus substantially increases the overall length of the heat exchanger and yet does not permit this increased length to be used in a practical manner.

Another problem commonly encountered in the formation of return elbows is the difficulty in putting the desired bends in the tube without causing undesired deformation or damage to the elbow. Many of the known techniques for forming and bending elbows have resulted in the tube wall being at least partially collapsed or radially inwardly deformed, particularly throughout the bent portion. This not only results in irregularities in the tube cross section, but also reduces the flow area through the tube, thereby imposing an undesired flow restriction through the heat exchanger. The known bending techniques have also often caused undesirable wrinkling of the tube wall, particularly on the inner radius of the bend, which weakens the tube and disrupts the optimum flow of heat exchanger fluid.

Accordingly, it is an object of the present invention to provide an improved apparatus for forming and bending return or cross-over elbows, which apparatus overcomes the above-mentioned disadvantages. More specifically, it is an object of the present invention to provide:

1. An apparatus, as aforesaid, which permits the formation of a cross-over elbow having two bend portions joined by an intermediate straight portion, which elbow can be formed by a single bending operation.

2. An apparatus, as aforesaid, which permits the formation of a cross-over elbow in a manner which prevents collapsing, wrinkling, or other undesired deformation of the elbow during the bending process, and which results in an elbow which is of smooth and uniform curvature and possesses a smooth and uniform flow opening therethrough.

3. An apparatus, as aforesaid, which utilizes a mandrel positioned interiorly within the tube stock during bending thereof, which mandrel is progressively withdrawn from the tube stock in correspondence with the progressive bending thereof so that the interior mandrel is always positioned at the point of bending and provides interior support for the tube wall to prevent collapsing thereof during the bending operation.

4. An apparatus, as aforesaid, which permits return elbows to be automatically and repetitively formed at a high rate of production while resulting in elbows of high quality and minimum dimensional variations.

5. An apparatus, as aforesaid, which structurally and functionally is readily adapted to permit the simultaneous bending and formation of a plurality of identical elbows during each bending operation.

Other objects and purposes of the present invention will be apparent to persons familiar with structure of this general type upon reading the following specification and inspecting the accompanying drawings.

Certain terminology will be used in the following description for convenience in reference only and will not be limiting. For example, the words "upwardly", "downwardly", "rightwardly" and "leftwardly" will refer to directions in the drawings to which reference is made. The word "forwardly" will refer to the direction along which the tubular stock is advanced, which direction is from right to left in FIGS. 2, 3 and 5. The words "inwardly" and "outwardly" will refer to directions toward and away from, respectively, the geometric center of the apparatus and designated parts thereof. Said terminology will include the words specifically mentioned, derivatives thereof, and words of similar import.

SUMMARY OF THE INVENTION

The objects and purposes of this invention, including those set forth above, have been met by providing an apparatus having a forming arbor stationarily mounted on a frame. The forming arbor has an exterior groove for accommodating therein a tube, which groove determines the shape of the elbow being formed. A mandrel assembly is movably supported on the frame and includes a wiping member disposed directly opposite the arbor and having a further groove therein which cooperates with the groove in the arbor to confine the tube therebetween. The mandrel assembly also includes an elongated rodlike mandrel which is slidably inserted into the free end of the tube, after the latter has been fed into a position adjacent the arbor. The mandrel assembly is mounted on a first support structure which is rotatably supported on a second support structure, the latter being slidably supported on a third support structure which is rotatably supported on the frame for rotative movement through a limited angular extent, such as 180°. A cam-and-follower arrangement structurally connects the mandrel assembly to the stationary arbor so that, upon swinging movement of the third support structure, the mandrel assembly and the associated wiper is swingably moved around the arbor which causes a simultaneous and substantially linear retraction of the mandrel from the tube accompanied by a simultaneous bending of the tube about the arbor at a point which closely conforms with the tip end of the mandrel. Since the groove formed in the arbor preferably includes an intermediate straight portion joined between two bend portions, the cam-and-follower arrangement maintains the mandrel assembly and specifically the wiper closely adjacent the arbor during the swinging of the third support structure, and also permits the wiper to be slidably moved along the straight section of the arbor, during which the second mounting structure is slidably displaced relative to the third mounting structure as the latter continues its rotative swinging movement. After the bending operation has been completed, caused by the 180° swinging movement of the third support structure, the mandrel assembly is energized to fully extend same whereby the mandrel is fully withdrawn from the tube. The third suport structure is then rotatively angularly displaced 90° in the opposite direction, following which the formed elbow is severed from the tube. The third support structure, and the mandrel assembly carried thereby, is then rotatably returned to its original position.

DETAILED DESCRIPTION

Figure 1:
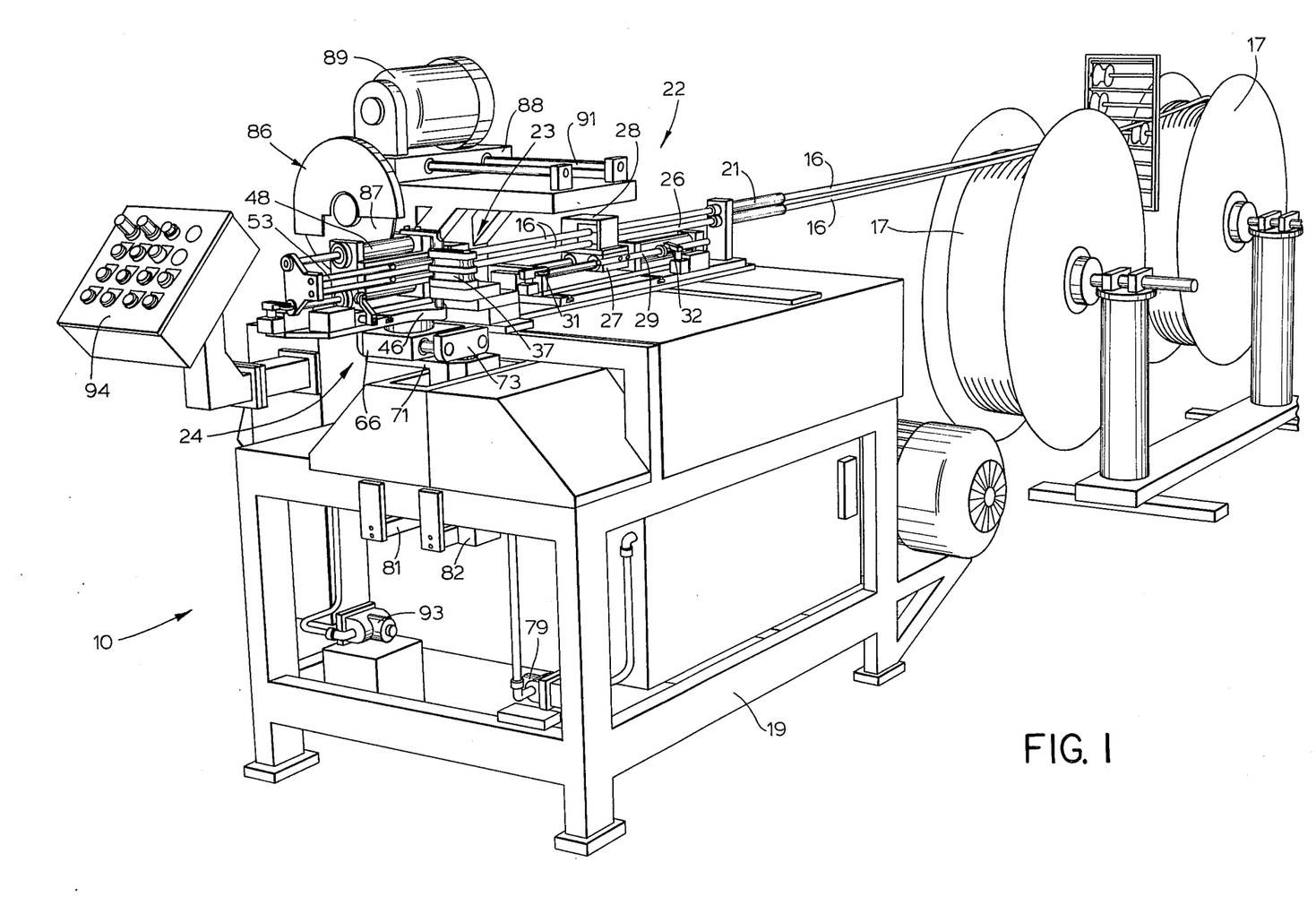
FIG. 1 is a perspective view of the inventive apparatus for forming a return elbow.
Figure 2:
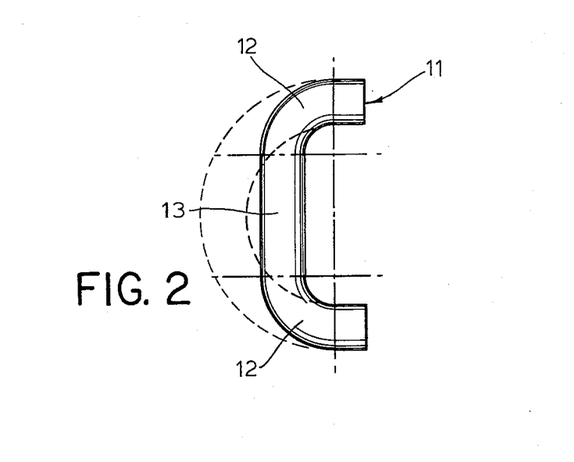
FIG. 2 shows a typical return elbow formed by the inventive apparatus.

FIG. 1 illustrates therein an apparatus 10 for forming return or cross-over elbows, such as the elbow 11 illustrated in FIG. 2. The apparatus 10 is particularly designed to permit formation of an elbow 11 which has a pair of curved or bent portions 12 joined by an intermediate straight portion 13. The elbow 11 illustrated in FIG. 2 specifically employs two curved portions 12 which extend through 90°, so that the elbow thus has a C-shaped configuration and undergoes a total bend of 180°.

The apparatus 10 is designed to permit formation of return elbows 11 from a substantially continuous straight tube 16, such as a copper tube, which is conventionally supplied in the form of a large spool 17.

While the drawings illustrate the apparatus 10 as being simultaneously supplied with two tubes 16 to permit the simultaneous formation of two identical elbows 11, it will be appreciated that the basic apparatus 10 is designed to cooperate with a single tube 16 to form a single elbow during each bending operation or, in the alternative, the same basic apparatus can be made to cooperate with more than two tubes depending upon the size and power requirements of the overall apparatus. Accordingly, the following description will be concerned solely with a single tube and the manner in which it is bent and formed into an elbow, but it will be appreciated that this description is equally applicable to the identical structure which permits the apparatus to handle two or more tubes.

Referring generally to FIG. 1, this apparatus 10 includes a frame 19 provided with a guide device 21 which, in the illustrated embodiment, is formed as an elongated tubular guide through which the tube 16 as supplied from the spool 17 is slidably guided, which guide 21 additionally assists in straightening the tube 16. A tube feeding device 22 is disposed adjacent the discharge end of the guide 21 and cooperates with the tube 16 to intermittently linearly advance same through a preselected distance. The tube 16, as advanced by the feeding device 22, is supplied through a conventional tube clamping structure 23 which is stationarily mounted on the frame and is disposed directly adjacent the elbow forming device 24.

Figure 5:
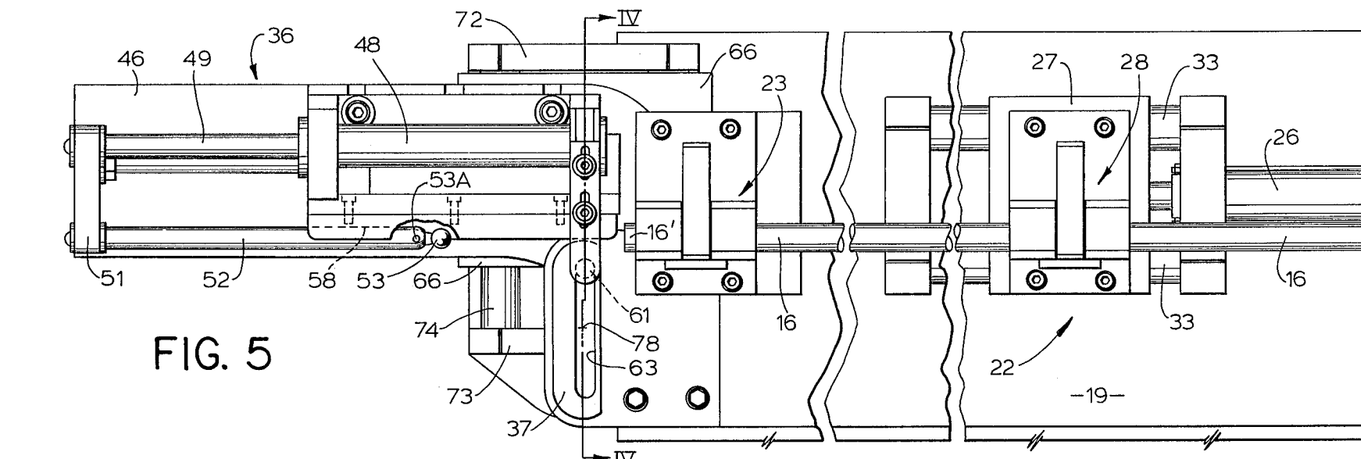
FIG. 5 is a fragmentary top view of the structure shown in FIG. 3 and illustrating the bending apparatus in the initial position prior to initiation of bending operation or cycle.

The tube feeding device 22, as illustrated in FIGS. 1 and 5, includes a pressure cylinder 26 which is mounted on the frame and has the reciprocating piston rod thereof connected to a slide block 27, the latter being slidably supported for linear reciprocating movement on a pair of stationary guide rods 33. The slide block 27 has a split tube clamping unit 28 mounted thereon, which clamping unit has opposed and relatively movable jaws which define an opening through which passes the tube 16, and which jaws are adapted to clamp the tube 16 and cause same to be linearly advanced during the forward (leftward in FIG. 5) advancing movement of the slide block 27. The clamping unit 28, and the clamping structure 23 which is identical thereto, is of a substantially conventional construction and may have the relatively movable jaws actuated in a suitable manner, as by means of an electromagnet.

The slide block 27 additionally has a control rod 29 mounted thereon and extending parallel to the guide rods 33. This control rod 29 is positioned for actuating a pair of spaced limit switches 31 and 32 for determining the end positions of the slide block 27.

Figure 3:
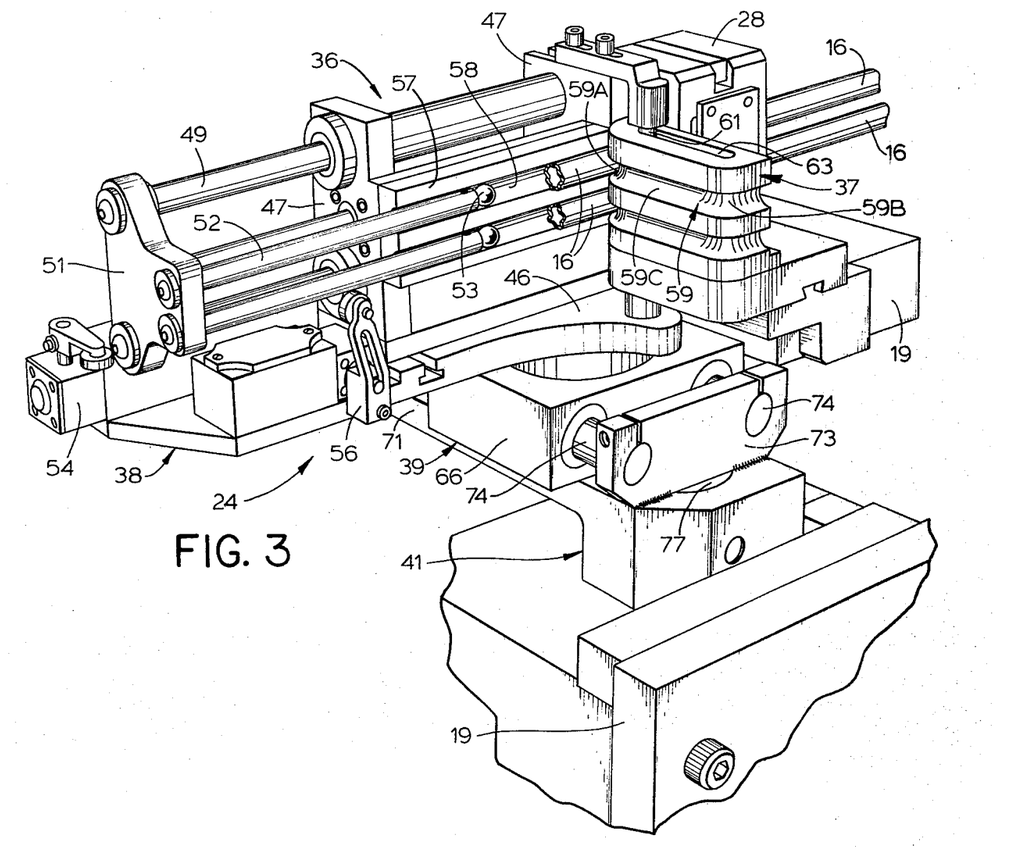
FIG. 3 is a fragmentary perspective view of a portion of FIG. 1 as taken on an enlarged scale.
Figures 4, 9:
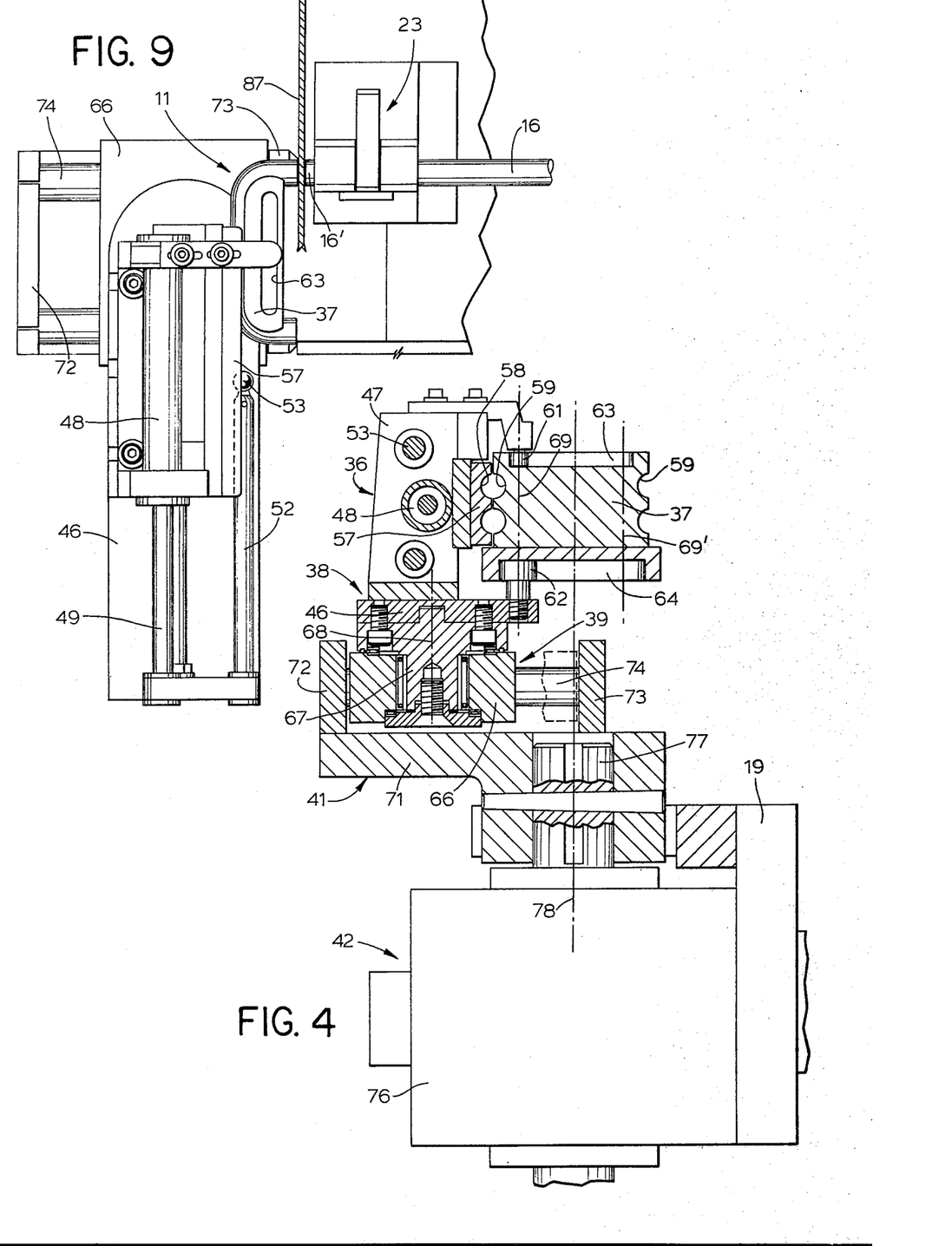
FIG. 4 is a sectional view taken substantially along the line IV—IV in FIG. 5.
FIG. 9 is a top view showing the bending apparatus in an intermediate position during the return movement thereof from the FIG. 8 position back to the original FIG. 5 position.

Referring now to FIGS. 3 and 4, the elbow bending device 24 includes a mandrel assembly 36 which cooperates with a stationary arbor 37. The mandrel assembly 36 is mounted on a first support structure 38 which is pivotally supported on a second support structure 39, the latter being slidably supported on a third support structure 41. This last mentioned support structure 41 is rotatably supported on the frame 19 and is connected to a drive device 42 (FIG. 4) for causing the structure 41 to be alternately rotated back and forth through a selected angular extent, which is 180° in the illustrated embodiment.

The first support structure 38 includes a substantially horizontal support plate 46 which has a pair of parallel plates 47 fixed thereto and projecting upwardly therefrom. These plates 47 in turn support a horizontally oriented fluid pressure cylinder 48, the piston rod 49 of which slidably projects horizontally outwardly from one end thereof and is anchored to a movable connecting plate 51. A rodlike mandrel 52 is fixedly anchored to this connecting plate 51 and projects outwardly therefrom back toward the pressure cylinder in parallel relationship to the piston rod 49. The mandrel 52 has an external diameter which is slightly smaller than the internal diameter of the tube 16, and is provided with a ball or spherical element 53 hingedly connected to the free end thereof, as by a vertical hinge pin 53A. The ball 53 is of substantially the same diameter as the mandrel 52.

The connecting plate 51, and the mandrel 52 mounted thereon, is horizontally and linearly movable back and forth with respect to the support structure 38 due to selective pressurization of the double-acting pressure cylinder 48. To control the end positions of the mandrel movement, a pair of limit switches 54 and 56 are mounted on the support plate 46 and are positioned for engaging the connecting plate 51 for determining the extended and contracted positions, respectively, of this plate.

The mandrel assembly 36 also has a wiper 57 associated therewith, which wiper cooperates with the arbor 37 for confining the tube 16 therebetween during the bending operation. The wiper 57 is formed as an elongated blocklike member which extends between and is fixedly mounted on the upright plates 47. An elongated straight groove 58 is formed in and extends horizontally along the exposed surface of the wiper 57. This groove 58 is of a substantially semi-cylindrical cross section and is substantially coaxially aligned with the infeed direction of the tube 16 when the mandrel assembly is disposed in the position illustrated in FIG. 3. This groove 58 is also substantially coaxially aligned with the mandrel 52 so that at least a portion of the rodlike mandrel 52 is always slidably accommodated within the groove 58, whereby the mandrel 52 is thus also aligned with the infeed direction of the tube 16.

The arbor 37, which is stationarily mounted on the frame 19, is positioned directly adjacent and slightly spaced from the wiper 57. The arbor 37 also has a groove 59 formed in the exterior side surfaces thereof, which groove 59 is also of a substantially semi-circular cross section and is disposed at the same elevation as the wiper groove 58 so that the grooves 58 and 59, when disposed closely adjacent one another as illustrated in FIG. 4, define a substantially cylindrical bore in which the tube 16 is closely and slidably guided.

The groove 59, when viewed in the longitudinal direction thereof, has a configuration corresponding to the elbow 11 which is to be formed during the bending operation. For this reason, the groove 59 thus includes identical curved portions 59A and 59B located adjacent the opposite corners of the arbor, which curved portions each extend through a 90° angle and are joined together by an intermediate straight groove portion 59C.

The support structure 38 also has a pair of opposed roller-type cam followers 61 and 62 (FIG. 4) mounted thereon and movably confined within elongated slots 63 and 64, respectively. The latter-mentioned slots are disposed directly over one another and open outwardly in opposite directions from the upper and lower ends of the stationary arbor 37. These slots extend in a direction which is substantially perpendicular to the infeed direction of the tube 16. The purpose of the cam followers 61-62 and their cooperation with the slots 63-64 will be explained hereinafter.

The support structure 38, and particularly the support plate 46, is provided with a pivot shaft 67 which projects downwardly therefrom and is rotatably supported within a bore formed in a slide block 66, which slide block comprises the second support structure 39. The pivot shaft 67 defines a vertical rotational axis 68 about which the first support structure 38, and the mandrel assembly 36 mounted thereon, can be swingably displaced during the bending operation.

The slide block 66 is in turn slidably supported on the third support structure 41 which, as illustrated in FIGS. 3 and 4, includes a swingable support arm 71 which has a pair of end plates 62 and 73 fixed to and projecting upwardly from the upper surface thereof. These end plates 72 and 73 are substantially parallel, and a pair of parallel guide rods 74 extend between and are fixedly mounted on the end plates. These guide rods 74 extend horizontally and slidably support the slide block 66 thereon, whereby the slide block 66 and the first support structure 38 mounted thereon can thus be linearly displaced from a first position wherein the slide block is disposed adjacent the end plate 72, substantially as illustrated in FIG. 4, into a second position wherein the slide block 66 is disposed closely adjacent the opposite end plate 73.

The third support structure 41, and particularly the swingable support arm 71, is rotatably displaced by the drive device 42 (FIG. 4) which includes a conventional birotational fluid motor 76 which has the output shaft 77 thereof nonrotatably keyed to the swingable support arm 71, whereby the support arm 71 is thus swingable about a vertical rotational axis 78 defined by the shaft 77. Pressure fluid is supplied to the rotary motor 76 from a conventional power source, such as a pump 79 (FIG. 1).

In the illustrated embodiment, the bending device permits an elbow bending operation to be carried out due to an angular swinging displacement of the support arm 71 back and forth through an angular extent of 180°. For this purpose, suitable limit switches 81 and 82 (FIG. 1) are mounted on the apparatus and cooperate with the support arm 71 for defining end positions of the arm which are spaced 180° apart.

The rotational axis 78 is substantially vertically aligned with the midpoint of the slots 62 and 63 formed in the stationary arbor 37. This axis 78 is, however, radially displaced from the pivot axis 68 so that this pivot axis thus swingably moves back and forth along a horizontal path about the axis 78.

The apparatus 10, as shown in FIG. 1, also includes a severing device 86 to permit cutting of the formed elbow from the tube. This severing device includes a rotary saw blade 87 which is supported on a slidable carriage 88, which in turn mounts thereon an electric motor 89 for driving the saw blade. The blade 87 is rotatable about an axis which is parallel to the infeed direction of the tube, and the carriage 88 is slidably movable along rails 91 which extend perpendicular to this infeed direction. The carriage 88, and the saw blade carried thereon, is slidably reciprocated back and forth on the rails 91, as by means of an endless chain drive (not shown), to permit cutting or severing of the formed elbow from the tube 16 after completion of the bending operation.

The apparatus 10 also includes additional power devices associated therewith, such as the pump 93 for supplying pressure fluid to the mandrel pressure cylinder 48. A control panel 94 is also associated with the machine to permit an operator to be positioned closely adjacent the machine to control the various manipulations thereof.

OPERATION

The operation of the apparatus will be briefly described to insure a complete understanding thereof. In this description, the leading free end of the tube 16 will be designated 16' to facilitate the description and the appropriate cross reference to the drawings.

Prior to initiation of an elbow bending operation, the elbow forming device 24 is disposed in the position illustrated in FIGS. 3 and 5, in which position the power cylinder 48 is in its extended position and the mandrel 52 is thus in a retracted position wherein it is spaced forwardly of the nip between the arbor 37 and wiper 57. In this initial position, the tube 16 has the leading edge 16' thereof projecting slightly beyond the clamping unit 23, and the tube 16 is clampingly held by this unit 23. The leading edge 16' of the tube 16 is thus positioned closely adjacent but slightly spaced from the nip between the arbor 37 and wiper 57, with the tube 16 and mandrel 52 thus being coaxially aligned.

To initiate a cycle of operation, the clamping unit 28 associated with the feeding device 22 is energized to clampingly engage the tube 16, and substantially simultaneously therewith the other clamping unit 23 is released. Pressure fluid is then supplied to the cylinder 26 which causes same to extend, whereby the slide block 27 and the clamping unit 28 mounted thereon are linearly displaced along the guide rods 33 (leftwardly in FIG. 5), which in turn feeds the tube 16 forwardly (leftwardly in FIG. 5) so that the leading edge 16' thus passes through the nip formed by the grooves 58 and 59 and is slidably displaced along the groove 58. This forward feeding of the tube 16 continues until the leading end 16' of the tube 16 slidably telescopes over the leading end of the mandrel 52 and until the leading end 16' is disposed adjacent the leftward end of the wiper 57. When the tube 16 has been advanced through this preselected distance, then the collar 29' (FIG. 1) on the control rod 29 contacts the limit switch 31 and stops further extension of the power cylinder 26. When the tube 16 reaches this fully advanced position, then the clamping unit 23 is also energized to clampingly engage the tube 16.

Figure 6:
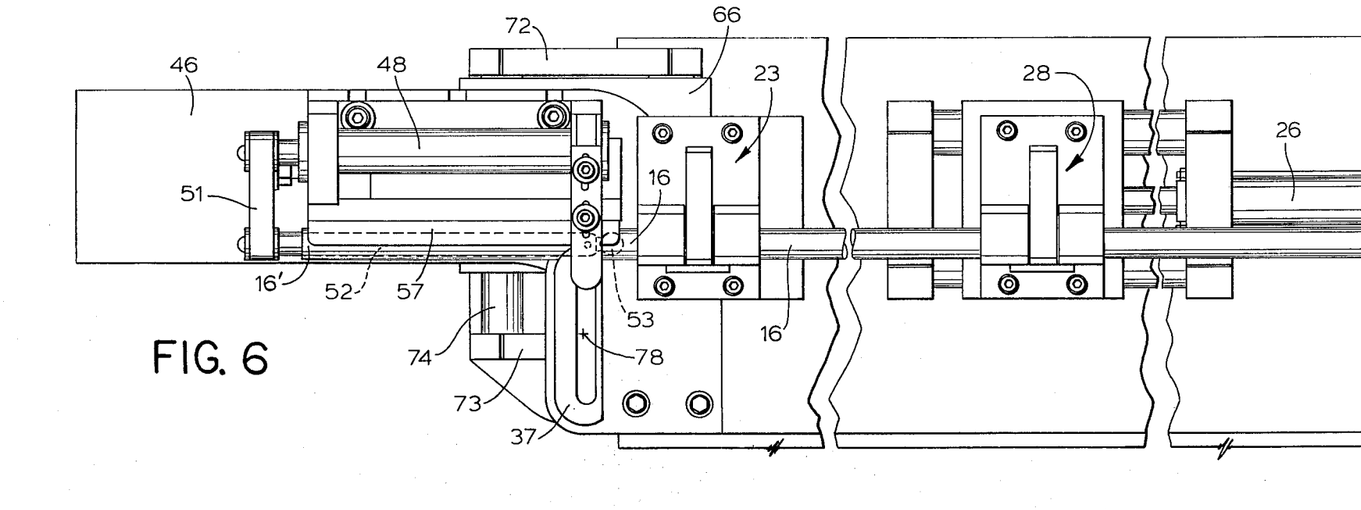
FIG. 6 is a top view similar to FIG. 5 and showing the bending apparatus after insertion of the mandrel into the tube stock.

With the tube 16 in its advanced position and held by the clamping units, then the power cylinder 48 associated with the mandrel assembly is energized to cause contraction thereof, thereby moving the mandrel 52 from the position illustrated in FIG. 5 into the position illustrated in FIG. 6. This movement results in the mandrel 52 being slidably telescopically moved through a greater extent into the tube 16, which inward movement of the mandrel 52 continues until the rigid free end thereof is disposed substantially directly at the nip between the arbor 37 and wiper 57, which nip is thus positioned substantially at the beginning of the curved portion 59A of the groove 59, and is defined between the directly opposed portions of the grooves 58 and 59. When the mandrel 52 has reached this position, the ball 53 has thus been moved through the nip.

When the mandrel assembly reaches this latter-mentioned position, as illustrated in FIG. 6, the initial feeding and set up manipulations have been completed, so that the actual bending of the tube can then commence.

Figures 7, 8:
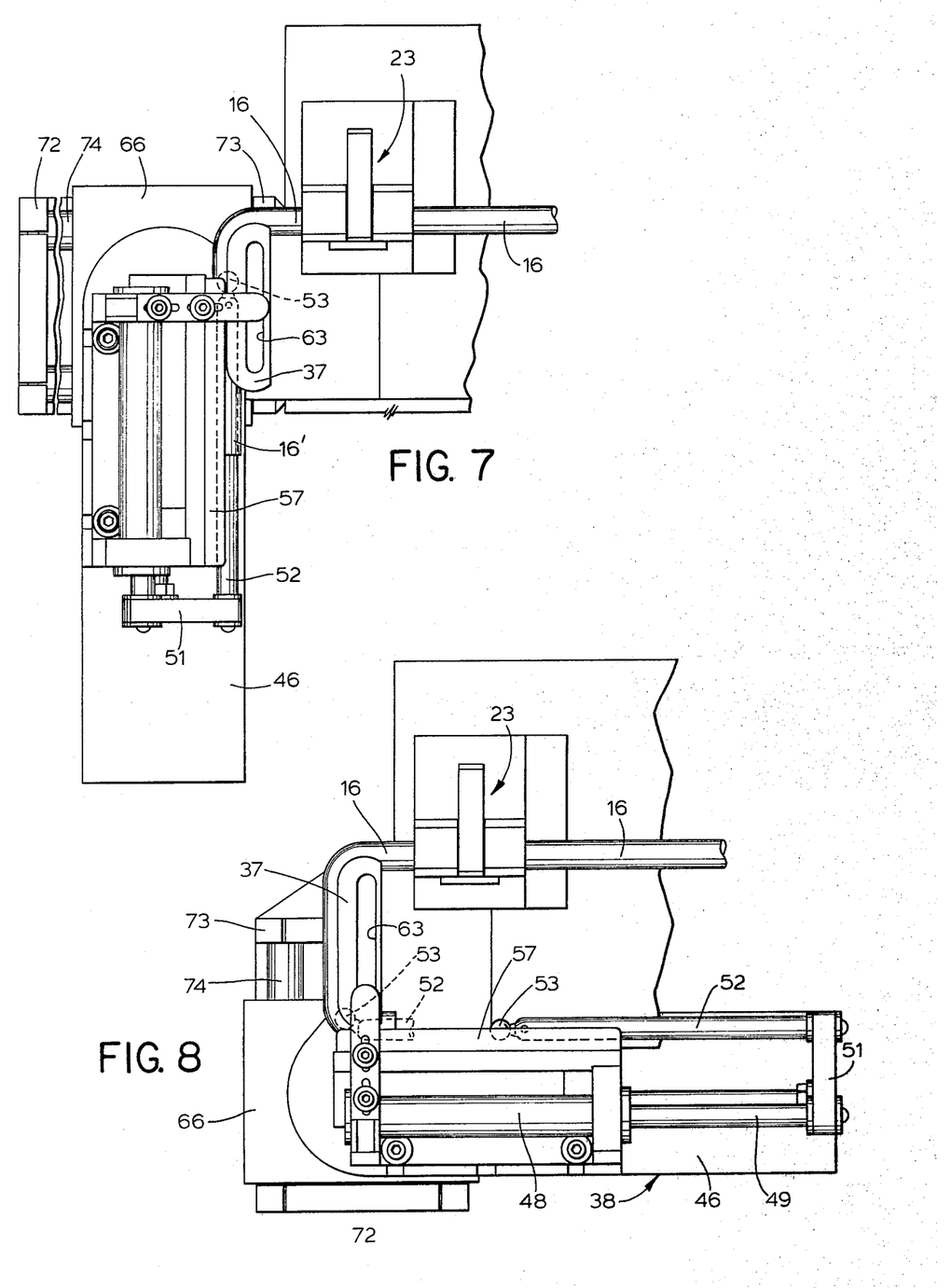
FIG. 7 is a top view similar to FIG. 6 and showing the mandrel assembly after it has been moved 90° during the forward bending stroke.
FIG. 8 is a view similar to FIG. 7, but showing the bending apparatus after it has completed the forward bending stroke.

The rotary motor 76 is then energized to cause the support arm 71 to be rotatably displaced through an angle of approximately 180°, which rotary displacement of the arm 71 occurs in a counterclockwise direction as viewed in FIGS. 6-8 and results in the elbow forming device 24 being moved from the initial bending position of FIG. 6 through the intermediate bending position of FIG. 7 into the completed bending position of FIG. 8. During this displacement of the bending device 24, due to counterclockwise swinging of the support arm 71, the mandrel pressure cylinder 48 is continuously maintained in its contracted position.

The movement of the elbow bending device from the initial FIG. 6 position into the intermediate FIG. 7 position, and then finally into the completed FIG. 8 position, will now be considered in greater detail.

As the support arm 71 is initially swingably moved away from the position shown in FIG. 6, the first support structure 38 wants to follow this swinging movement but is prevented from doing so due to the cam rollers 61 and 62 being confined within the ends of the slots 63 and 64. These cam rollers thus define a pivot axis 69 which, as shown in FIG. 4, is disposed between the axes 68 and 78 so that, as the arm 71 rotates about axis 78 away from the FIG. 6 position, it causes the first support structure 38 and the mandrel assembly 36 mounted thereon to rotate about the axis 69 defined by the cam rollers. This is permitted due to the first support structure 38 being pivotally supported on the slide block 66 for relative rotation therebetween about the axis 68, and this additionally causes the slide block 66 to be linearly slidably displaced along the rails 74 (rightwardly in FIG. 4) away from the end plate 72 toward the end plate 73. This swinging of the mandrel assembly 36 and of the wiper 57 about the axis 69, which axis 69 effectively corresponds to the center of the curved groove portion 59A when the cam rollers are at the ends of the slots, thus results in the wiper 57 moving around the curved corner of the arbor 37 with a motion similar to that created by a wheel rolling along a flat surface, which thereby results in the creation of a small nip between the grooves 58 and 59, which nip progressively moves along the length of these grooves so that the tube 16 is thus progressively bent in conformance with the shape of the groove portion 59A.

During the progressive movement of the wiper 57 around and along the arbor 37, and the resultant progressive bending of the tube 16, the mandrel 52 is progressively withdrawn from the tube 16, whereby the rigid free end of mandrel 52 moves along with the wiper 57 and thus always remains positioned substantially at (or slightly behind) the nip between the grooves 58 and 59 to thus control the progressive bending of the tube. The ball element 53 is positioned within the tube 16 and trails the point of bending to prevent collapsing or buckling of the tube wall during bending thereof, and to cause reshaping of the bent tube into a circular cross-section if necessary.

After the mandrel assembly has passed around the curved groove portion 59A, the continued swinging movement of the arm 71 results in the mandrel assembly and the wiper 57 moving linearly along the arbor 37 so as to pass through the straight groove portion 59C, during which movement no bending of the tube 16 occurs. In traversing along the straight groove portion 59C, the cam rollers 61 and 62 are linearly displaced along the grooves 63 and 64 from a position adjacent one end thereof into a position adjacent the other end thereof. During this phase of the movement, however, when the swingable support arm 71 reaches the FIG. 7 position wherein it is displaced 90° from the original FIG. 6 position, the slide block 66 has been moved into a position closely adjacent the end plate 73 substantially as illustrated by dotted lines in FIG. 4. Continued swinging movement of the arm beyond this 90° position illustrated in FIG. 7 toward the position of FIG. 8, now results in the slide block 66 being linearly slidably displaced along the rods 74 in the opposite direction (leftwardly in FIG. 4) until the slide block 66 again reaches its original position closely adjacent the other end plate 72, which original position is reached when the support arm 71 is swingably displaced 180° (as shown in FIG. 8).

As the support arm 71 swingingly approaches the 180° position of FIG. 8, the cam rollers 61–62 reach the other ends of the slots 63–64 and then effectively pivot about the axis 69' (FIG. 4). The mandrel assembly and the wiper 57 then pivot about this axis 69' so as to follow around the other curved groove portion 59B to thereby form a further 90° bend in the tube 16 substantially in the same manner as previously formed around the curved groove portion 59A.

Upon completing the 180° swinging movement of the arm 71, the support plate 46 will be disposed in the position illustrated in FIG. 8, although the mandrel pressure cylinder 48 will still be in its fully contracted position, so that the ball 53 and the rigid free end of the mandrel 52 will still be disposed within the tube 16 closely adjacent the free end 16' thereof, substantially as illustrated by dotted lines. The dotted line position indicates that the mandrel has been progressively withdrawn from the tube in correspondence with the displacement of the wiper, whereby the tip of the mandrel has thus progressively moved along the tube in phase with that portion of the tube which is being bent. Upon stoppage of the support plate 46 in the FIG. 8 position, the mandrel power cylinder 48 is then energized to extend same into the illustrated position, thereby causing the mandrel 52 to be completely withdrawn from the tube and spaced axially a substantial distance from the free end thereof.

The clamping unit 28 is then deenergized so as to release the tube, and power cylinder 26 is energized in the reverse direction so that slide block 27 and clamping unit 28 are thereby returned (rightwardly in FIG. 5) to their original position. During this return movement of the feeding device, the tube 16 remains in its advanced position due to its engagement with the clamping unit 23.

The fluid motor 76 is then energized in the opposite direction to swing the support arm 71 in a clockwise direction away from the position of FIG. 8 through an angle of approximately 90° into the position of FIG. 9. During this swinging movement, the mandrel pressure cylinder 48 is maintained in its extended position so that the mandrel 52 will thus swing clear of the bent tube 16 which still surrounds the stationary arbor 37. The motor 76 is stopped when the support arm 71 reaches the 90° return position shown in FIG. 9, in which position the tube 16 is still clamped by the clamping unit 23 and the bent portion of the tube is confined and held between the arbor 37 and the wiper 57. The severing device 86 is then energized so that the carriage 88 is moved outwardly along the rails 91 whereby the rotary saw blade 87 severs the tube 16 directly adjacent the clamping unit 23, as illustrated in FIG. 9. The forward advancing movement of the saw blade continues sufficiently so that the blade 87 also severs the free end of the bent portion of the tube, so that both legs of the thus formed elbow 11 are accordingly of the same length. The carriage 88 and the saw blade 87 are then retracted back into their original position, following which motor 76 is again energized to thereby cause further clockwise swinging of the arm 71 through an additional 90° so that the arm 71, the support plate 46 and the mandrel assembly 36 are thus returned into their original position as illustrated in FIG. 5. Upon being returned into this original position, the formed elbow 11 can then be removed from the arbor 37, either manually or by a suitable automatic removal device, following which the overall apparatus is then in position to initiate a further elbow forming operation which is identical to the above-described operation.

While the present invention is designed particularly for forming a C-shaped elbow 11 substantially as illustrated in FIG. 2, which elbow possesses an intermediate straight portion, nevertheless it will be appreciated that this invention is equally applicable for forming a C-shaped elbow having a semicircular configuration substantially as indicated by dotted lines in FIG. 2, since this profile could be provided on the stationary arbor 37. Further, while the bent portions of the elbow are disclosed as extending through 90°, it will be appreciated that the angular extent of these bent portions can be varied if desired.

While the drive and control structure for the apparatus 10 has not been illustrated and described in detail, nevertheless it is believed readily apparent that conventional controls and circuitry can be provided for energizing the various electrical and fluid powered sources in order to accomplish the operational functions which have been described above.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for forming a C-shaped elbow from an elongated tubular element, comprising:
   a frame;
   a first forming means stationarily positioned on the frame and having a first nonlinear forming groove extending at least part way therearound;
   support means swingably supported on said frame for swinging about a first pivot axis which is spaced from said first groove and extends substantially perpendicular to the lengthwise direction thereof;
   driving means connected to said support means to swingably move same between first and second positions which are spaced apart by a selected angular extent;
   a second forming means positioned adjacent said first forming means and having a second forming groove therein, with at least portions of said first and second forming grooves being disposed opposite one another to define a forming bore therebetween into which extends said tubular element;
   intermediate supporting means for supporting said second forming means on said support means for permitting said second forming means to both pivotally move relative to said support means about a second pivot axis which is substantially parallel to said first pivot axis and linearly moves relative to said support means within a plane which is substantially perpendicular to said first pivot axis; and guide means coacting with said intermediate supporting means for constraining same to move along a selected nonlinear path which is substantially parallel and conforms to the nonlinear configuration of said first forming groove in response to swinging movement of said support means, whereby said opposed first and second forming grooves thus define said forming bore therebetween which is progressively displaced along said first groove in response to swinging of said support means to cause progressive bending of said tubular element.

2. An apparatus according to claim 1, wherein said first groove is disposed substantially within a single plane and includes first and second curved portions joined together by an intermediate straight portion, said first groove opening toward said second groove and having a convex configuration when viewed in said latter-mentioned plane, and said second groove including an elongated straight portion which is also disposed within said plane and has a length which is at least equal to the combined length of the two curved and intermediate straight portions of said first groove.

3. An apparatus according to claim 2, wherein said guide means includes a cam structure coacting between said first and second forming means for causing said second forming means and the second forming groove formed thereon to be moved through an arcuate path past the first curved portion and then through a linear path past the intermediate straight portion and then through a further arcuate path past the second curved portion of said first groove, said cam structure causing said second forming means to rotate about axes which define the center points of the first and second curved portions when the second forming means is moving on arcuate paths therepast.

4. An apparatus according to claim 3, wherein said intermediate supporting means includes a first supporting member which is slidably supported on said support means for reciprocating linear displacement along a direction which is substantially perpendicular to said first pivot axis and is also substantially radial with respect thereto, and said intermediate supporting means including a second supporting member pivotally supported on said first supporting member for swinging movement about said second pivot axis, said second pivot axis being substantially parallel with but radially spaced from said first pivot axis, and said second forming means being fixedly mounted on said second supporting member.

5. An apparatus according to claim 4, wherein said cam structure includes elongated slot means fixedly associated with said first forming means and follower means mounted on said second forming means and being slidably guided within said slot means.

6. An apparatus according to claim 1, including mandrel means mounted on said intermediate supporting means in adjacent relationship with said second forming means, whereby said mandrel means and said second forming means both move synchronously with said intermediate supporting means, said mandrel means including an elongated rodlike mandrel movably supported on said intermediate supporting means for displacement between a first position wherein the rodlike mandrel is adapted to project into the tubular element and a second position wherein the rodlike mandrel is withdrawn from the tubular element.

7. An apparatus according to claim 6, wherein said rodlike mandrel when in said first position projects sufficiently into said tubular element as to have the free end thereof disposed substantially within said forming bore, and said rodlike mandrel being progressively withdrawn from said tubular element as said second forming means is moved along said selected nonlinear path parallel to said first groove.

8. An apparatus according to claim 7, wherein said intermediate supporting means includes an intermediate supporting member which is movably supported on said support means for both linear and angular movement relative thereto within a plane substantially perpendicular to said first pivot axis, and said second forming means and said mandrel means both being maintained stationary with respect to said intermediate supporting member during displacement of the latter in response to swinging movement of said support means from said first position toward said second position, whereupon said second forming means is thus moved along said selected path.

9. An apparatus for bending an elbow from a straight tube, comprising:
 a first forming means having a first elongated nonlinear forming groove formed thereon;
 a second forming means positioned adjacent said first forming means and having a second elongated straight forming groove formed thereon, said first and second forming grooves being disposed so that at least portions thereof are located directly opposite one another and define a forming bore therebetween into which projects said tube;
 means drivingly and supportingly connected to said second forming means for causing movement thereof from a first position along a preselected nonlinear path into a second position, said second forming means when in said first position having a portion of said second forming groove disposed directly opposite one end of said first forming groove, said second forming means when in said second position having a further portion of said second forming groove positioned directly opposite the other end of said first forming groove, and said preselected nonlinear path being substantially parallel and of a configuration corresponding to the nonlinear profile of said first forming groove;
 mandrel means mounted on said second forming means and movable therewith along said preselected path between said first and second positions, said mandrel means including an elongated rodlike mandrel which is always coaxially aligned with said forming bore and projects into the interior of said tube as said second forming means is being displaced along said path from said first position toward said second position; and
 drive means coacting between said second forming means and said mandrel means for selectively linearly moving said mandrel means relative to said second forming means.

10. An apparatus according to claim 9, wherein said drive means includes fluid pressure cylinder means connected between said second forming means and said rodlike mandrel for causing said rodlike mandrel to be linearly movable in the longitudinal direction thereof relative to said second forming means between an outer position wherein it is retracted from the tube and an inner position wherein it projects into the tube, said mandrel being maintained in said inner position when the second forming means is swingably moved from said first position toward said second position, said mandrel having the free end thereof disposed substantially within the forming bore, which free end is progressively withdrawn from the tube to permit progressive bending thereof in response to progressive movement of said second forming means from said first position toward said second position.

11. An apparatus according to claim 10, wherein said first forming groove in the lengthwise direction thereof includes two substantially 90° arcuate bends joined together by an intermediate straight portion so that said first groove has an outwardly opening convex profile when viewed in the lengthwise direction thereof, said second groove being substantially straight, and said mandrel being substantially aligned with said second groove so as to be linearly movable therealong between said inner and outer positions.

* * * * *